United States Patent Office.

SAMUEL H. GILMAN, OF GALVESTON, TEXAS.

Letters Patent No. 104,138, dated June 14, 1870.

IMPROVEMENT IN TREATING GRAIN TO OBTAIN EXTRACTIVE MATTER FOR COLORING AND FLAVORING SPIRITS.

The Schedule referred to in these Letters Patent and making part of the same.

*To all whom it may concern:*

Be it known that I, SAMUEL H. GILMAN, of the city and county of Galveston, in the State of Texas, have invented a new and useful Improvement in the Mode of Extracting the Flavor from Grain, to be employed in the flavoring of distilled liquors; and I do hereby declare that the following is a full, clear, and exact description of the same.

The fine flavor of old whisky is derived from the grain or mixture of grains from which it was distilled, and does not fully develop itself until after years of age have, by absorption of the cask, by evaporation, and by precipitation, cleared the liquor of its herbaceous and vegetable flavors and solid matters, and, by an insensible fermentation, fully developed the fine grain flavor so much sought for, and by which old whisky is distinguished from that which is newly made. What has thus been heretofore only accomplished by a considerable lapse of time, I obtain by my invention or discovery in a few days, by roasting the grains in a common coffee-roaster or other suitable vessel, then grinding them to coarsely-ground meal, and boiling the meal in a sirup made by dissolving white sugar in water, until the density of the sirup is about 20° Baumé. The proportions of the parts will vary according to tastes, but for one barrel of proof neutral spirits, I take, say, three quarts of the grain, (corn, oats, wheat, rye, or barley,) roasted, ground, and boiled in about three quarts of water, in which about two pounds of sugar have been dissolved, boiling this sirup until it is so thick that it will scarcely run out of the kettle when turned down on its side. This sirup should be well stirred into the barrel of proof neutral spirits, and the barrel rolled over or stirred once every day for three or more days, when it will be found that the liquor has a fine grain flavor and a good color. If the liquor is then subjected to my improved process for "ageing liquors," described in my Letters Patent, it will possess all the qualities of very old whisky. Twenty-four hours will allow the solid grain matter to settle, after which the clear liquor can be drawn off.

Careful roasting destroys the herbaceous and vegetable matters and flavor common to all raw grains, and leaves their true flavor free to be absorbed by the boiling sugar sirup, which has a well-known property for taking up any flavor brought into contact with it while hot, and imparting the same to alcoholic solutions.

The real flavor of any cereal or bean can be obtained in this manner, and imparted to alcoholic solutions, and with perfectly neutral or deodorized spirits a much better grain whisky can be made than in the usual way, because, when grains are ground raw and fermented in the usual manner, the alcohol distilled from the mass is impregnated equally with the herbaceous, vegatable, and true grain flavor, which requires years of age to separate, as rectification, if perfect, takes them all out, and leaves neutral or deodorized spirits, while my process separates the herbaceous and vegetable flavors from the fine grain flavor, which alone is imparted to the spirits.

I do not confine myself to the precise proportions of the several ingredients herein mentioned, as these proportions will vary according to taste and other circumstances. Nor do I limit my invention to liquor which is treated to a subsequent process of ageing described in my Letters Patent above referred to.

Having described my invention,

What I claim as new, and desire to secure by Letters Patent, is—

Boiling roasted and ground cereals and beans in sirup, for the purpose and in the manner described.

SAMUEL H. GILMAN.

Witnesses:
   N. B. YARD,
   G. D. BRIGGS.